United States Patent
Ben-Yaakov et al.

[15] 3,652,439
[45] Mar. 28, 1972

[54] APPARATUS FOR MEASURING PH IN HIGH-PRESSURE ENVIRONMENTS

[72] Inventors: Shmuel Ben-Yaakov, Beverly Hills; Isaac R. Kaplan, Sherman Oaks, both of Calif.

[73] Assignee: The Regents of the University of California

[22] Filed: Feb. 28, 1969

[21] Appl. No.: 803,173

[52] U.S. Cl............................204/195, 117/113, 117/231, 174/74 R, 204/279, 204/286, 321/60
[51] Int. Cl..................................G01n 27/30, G01n 27/36
[58] Field of Search.........................................204/1 T, 195

[56] References Cited

UNITED STATES PATENTS

| | | | |
|---|---|---|---|
| 2,595,042 | 4/1952 | Wyllie | 204/195 |
| 2,930,967 | 3/1960 | Laird et al. | 204/195 |
| 2,986,511 | 5/1961 | Digby | 204/195 |
| 3,410,779 | 11/1968 | Whitehead et al. | 204/195 |
| 3,463,717 | 8/1969 | Koopman et al. | 204/195 |
| 3,551,315 | 12/1970 | Friconneau et al. | 204/195 |

*Primary Examiner*—T. Jung
*Attorney*—Mellin, Moore & Weissenberger

[57] ABSTRACT

Continuous direct measurement of pH at great depths in the ocean from a surface vessel is accomplished by a cable-supported probe which measures the electric potential between an Ag/AgCl/glass membrane electrode and an Ag/AgCl reference electrode immersed in a reference solution in contact with the sea water; converts the measured potential into a variable-frequency signal in situ; and transmits the signal to readout equipment at the surface. The ruggedness and simplicity which make the device suitable for routine field use at great depths are achieved by pressure equalization in the electrode structures through membrane arrangements while maintaining high electrode insulation levels; by a simplified method of electrode preparation; by remote switching and calibrating of the pH sensor and associated temperature and pressure sensors; and by a simplified analog-to-frequency converter.

8 Claims, 11 Drawing Figures

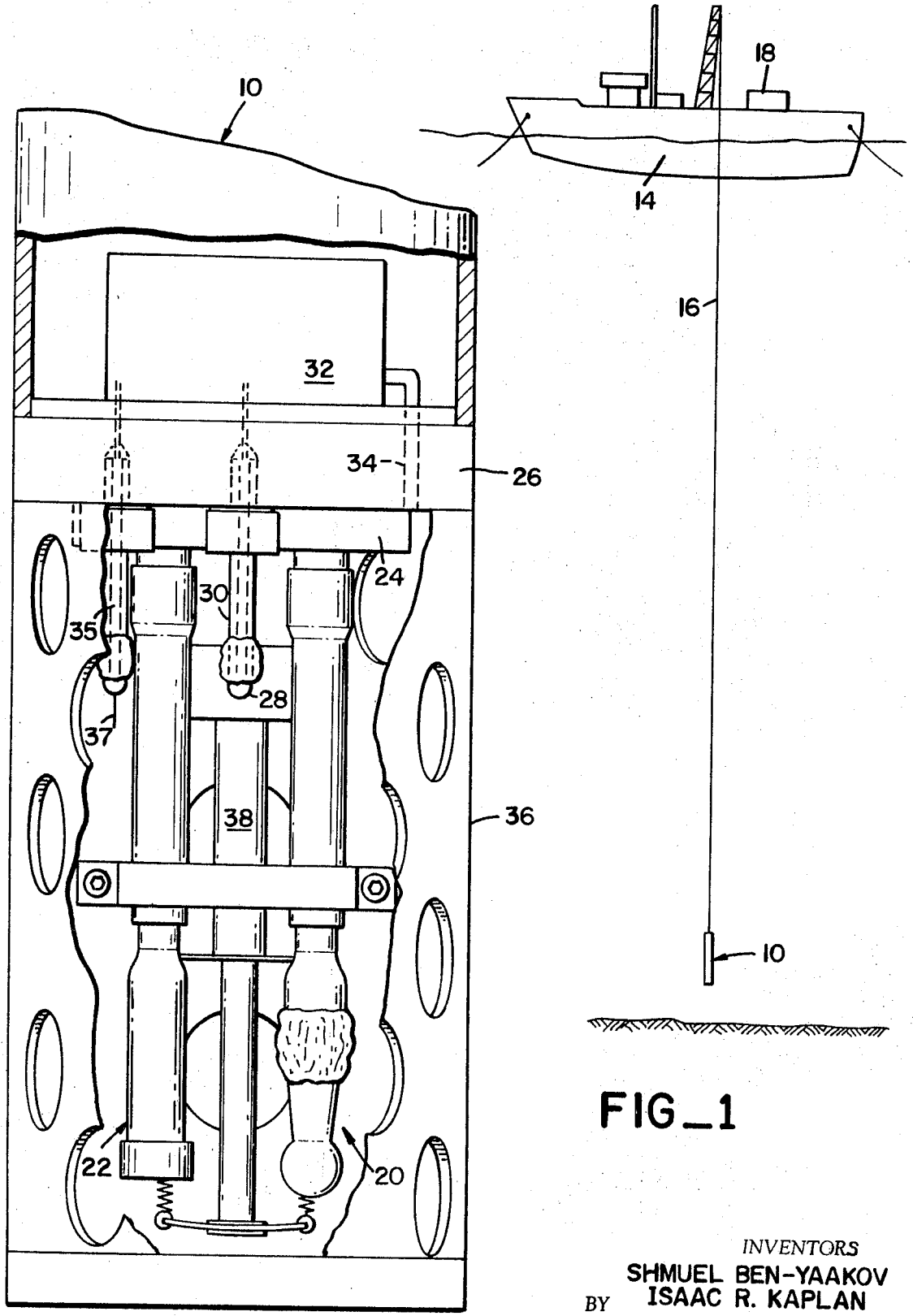

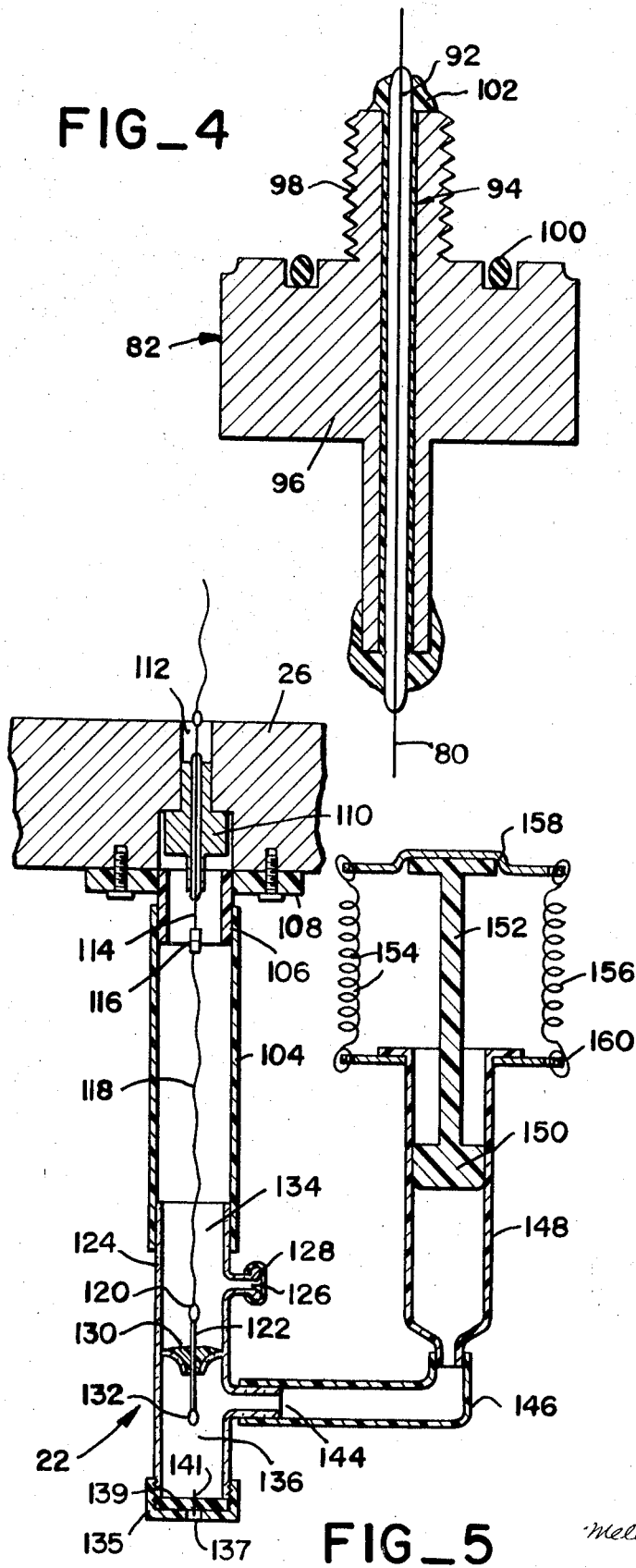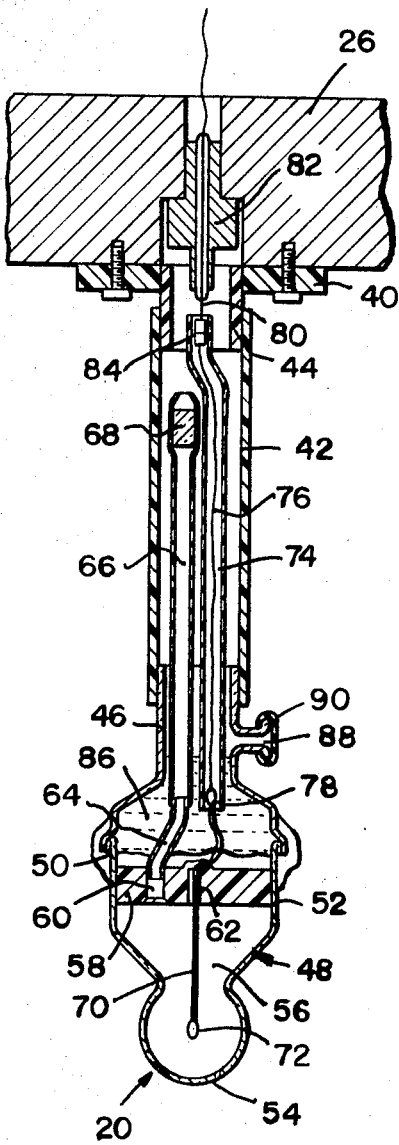

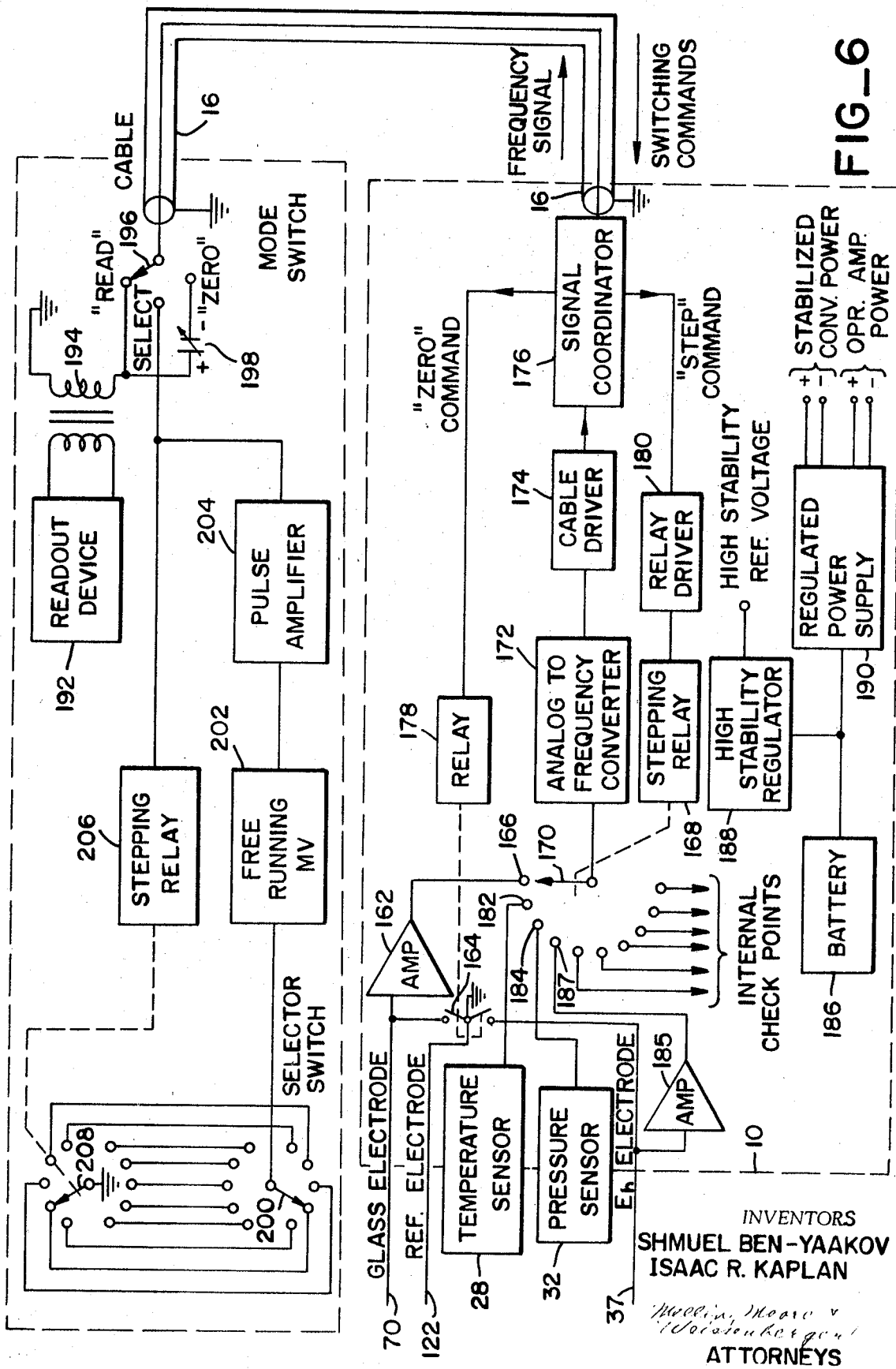
FIG_6

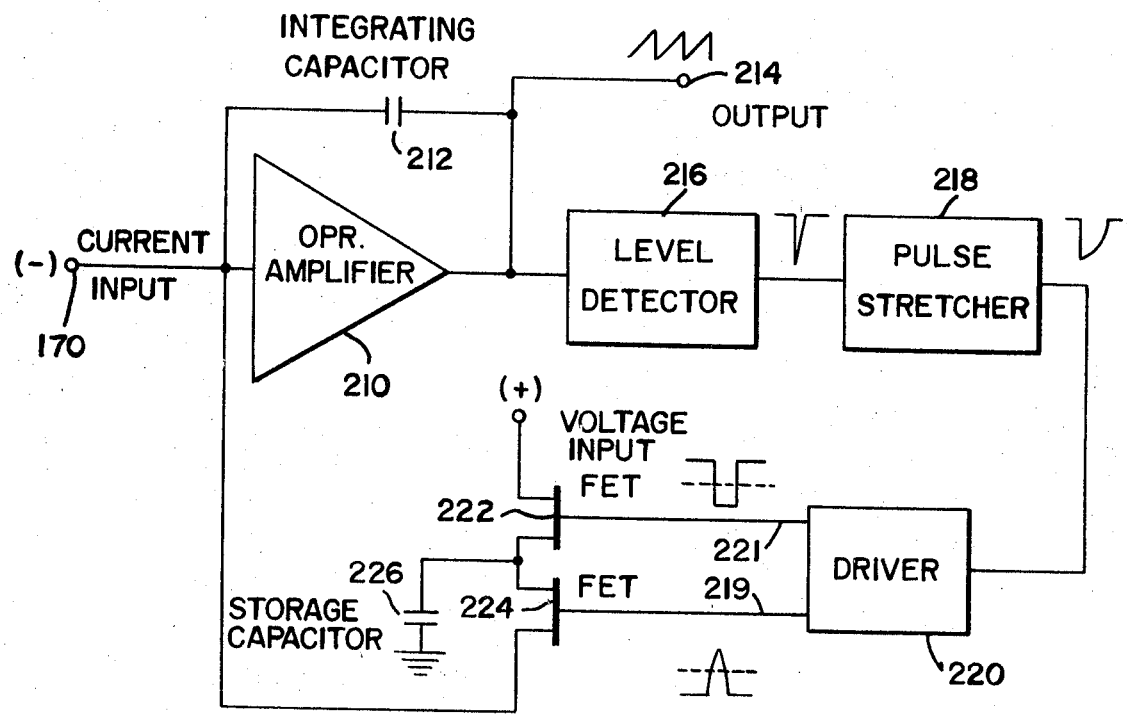
FIG_7
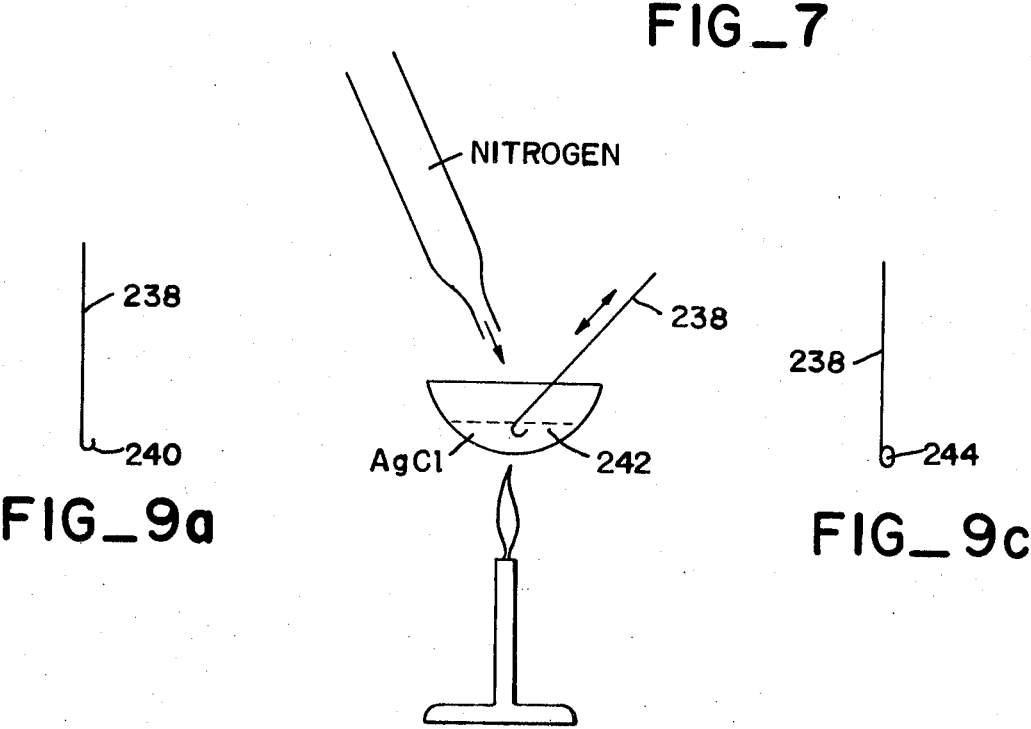
FIG_9a  FIG_9b  FIG_9c
INVENTORS
SHMUEL BEN-YAAKOV
ISAAC R. KAPLAN
BY
ATTORNEYS

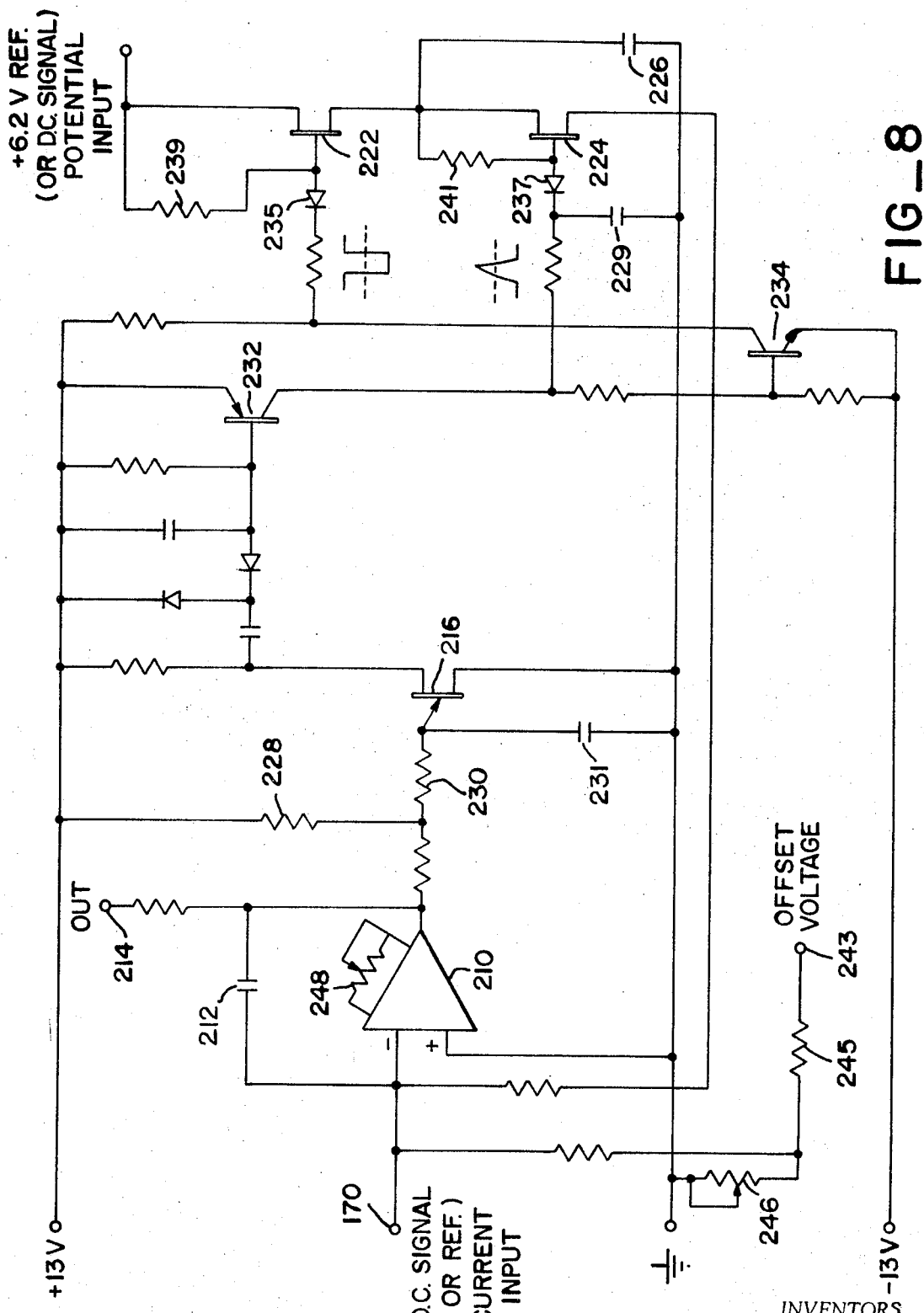
FIG_8

3,652,439

APPARATUS FOR MEASURING PH IN HIGH-PRESSURE ENVIRONMENTS

BACKGROUND OF THE INVENTION

The invention herein described was made in the course of a contract with the Office of Naval Research.

Devices for the measurement of pH (or more accurately, hydrogen ion activity) by means of a so-called "glass electrode" have been used since the late 1950's in oceanographic research and industrial applications. In these devices, a first Ag/AgCl electrode (the "glass" electrode) is immersed in a standard filling solution surrounded by a hydrogen-ion selective glass membrane, and a second Ag/AgCl electrode (the "reference" electrode) is immersed in another known standard filling solution which has ionic communication, by means of a semipermeable bridge, with an external test solution. The potential developed between the two electrodes is proportional to the difference between the hydrogen ion concentration of the glass electrode filler solution and that of the test solution. Consequently, by first calibrating the electrodes with a standard test solution of known pH and temperature, an accurate indication of the pH of an unknown test solution at the same temperature can be obtained by measuring the potential developed between the two electrodes.

When the chemical composition of the test solution is unknown, direct immersion of the reference electrode in the test solution introduces an unknown error due to the variable electrochemical potential developed by the action of, chloride ions on the metallic electrode. It is therefore necessary to immerse the reference electrode in a solution of known chloride ion activity, and to bring the reference solution into a liquid junction contact with the test solution. The potential developed across the liquid junction is the same for the standard test solution as for the unknown test solution, and is therefore of no consequence in the measurement of pH.

In the prior art (as illustrated by the low-pressure device shown in British Patent No. 1,068,820), this latter problem has been solved by placing the reference electrode into a leaky chamber filled with the reference solution, and placing the reference solution under pressure so that it would gradually leak out into the test solution.

As far as the electrode construction was concerned, it has been the usual practice of the prior art to electrolytically coat a silver wire with AgCl during the manufacture of the electrode, and to then immerse the coated wire in the solution. This method has had the drawback that any nonuniformity of the coating would result in potential variations which severely affected the accuracy of the device and required its frequent recalibration. Under severe operating conditions prior users have, in fact, reported the necessity of changing the electrodes rather frequently.

In the oceanographic field, glass electrode devices have been used at great depths by Albert Disteche as reported in Bulletin de l'Institut oceanographique de Monaco, Vol. 64 No. 1320, November 1964. However, the apparatus described in that reference was quite complex, could be handled and operated only in a vertical position, and was designed to be connected to its electrical cable in the water with attendant current leakage problems and resulting inaccuracies. Furthermore, the reference construction did not lend itself to the use of a reference solution on the reference electrode, and was therefore unsuitable for direct pH readout. For these reasons, the reference device was usable only from a bathyscaph and only for limited research use.

In short, the prior art deep-water pH measuring devices have either been unable to provide direct in situ measurement of pH with the accuracy required for most uses, or have been so complex, delicate and expensive as to make their use in routine oceanographic sounding impractical.

SUMMARY OF THE INVENTION

The purpose of the present invention is to provide a direct-reading pH measuring probe for routine use at considerable water depths (and consequently at very high pressures) directly from a surface vessel. For the purposes of such use, the invention provides an extremely simple and rugged construction which requires little care in handling and which results in a sufficiently inexpensive device so that its accidental loss during survey operations is not a major calamity.

The purposes of the invention are achieved in three principal ways by providing (1) a sturdy electrode construction which can be internally pressurized by the sea water itself through a flexible membrane, yet which is so designed that current leakage is kept to a minimum and the device can be handled and used in any position; (2) an apparatus for maintaining the reference electrode in a reference solution and providing a constant leakage rate of the reference solution into the sea water regardless of pressure; (3) a simple but effective circuit for converting the electrode potential (as well as other probe parameters to be measured) into variable frequency signals which can be selectively transmitted to the surface by an electrical cable without loss of accuracy; and (4) an electrode construction which is not subject to electrode deterioration. The latter is accomplished by forming a bead of silver chloride on a clean silver wire, and then immersing the wire and bead into a silver chloride saturated potassium chloride solution of high chloride-ion concentration which causes a uniform coating to be formed and automatically maintained on the electrode wire.

BRIEF DESCRIPTION OF THE DRAWINGS

FIG. 1 is a schematic view showing the use of the device of the invention;

FIG. 2 is a side elevation, partially broken away of the bottom portion of the probe, showing the various sensors as they are assembled together;

FIG. 3 is a vertical section of the glass electrode assembly;

FIG. 4 is a vertical section of the special electric inlet which brings the electrode connection from the pressurized area of the probe into the unpressurized area of the probe;

FIG. 5 is a vertical section of the reference electrode assembly;

FIG. 6 is a block diagram of the electrical apparatus associated with the device;

FIG. 7 is a block diagram of the analog-to-frequency converter used in the probe;

FIG. 8 is a circuit diagram of the frequency converter of FIG. 7; and

FIG. 9 a, b, c illustrate three successive steps in the manufacture of the Ag/AgCl electrodes used in this device.

DESCRIPTION OF THE PREFERRED EMBODIMENTS

FIG. 1 broadly illustrates the use of the device. In oceanographic surveying, the probe 10 is lowered from a survey ship 14 by an electrical cable 16 which both supports the probe 10 and connects it to the readout apparatus 18 aboard the ship 14. A prototype of the probe of this invention has been satisfactorily used to depths of about 2400 feet, although greater depths can be attained merely by increasing the physical strength of the structures involved without change in their arrangement or operation.

FIG. 2 shows the various sensors incorporated into the lower end of the probe 10. The glass electrode assembly 20 and reference electrode assembly 22 are mounted in a bracket 24 attached to a steel plate 26 which forms the lower end of the upper, pressure-tight section of the probe 10. It will be understood that all portions of the probe lying below the plate 26 are exposed to the pressure of sea water when the device is in use.

Also mounted on the plate 26 is a thermistor 28 attached to the lower end of a pressure-tight feed-through fitting 30. A pressure sensor 32 is located in the body of the probe above the plate 26 and communicates with the sea water through the opening 34 in plate 26.

A pressure-tight feed-through fitting 35 supports an $E_h$ electrode 37. This electrode is a bare platinum wire which in the use of the device, is immersed directly into the test solution. The potential developed between the electrode 37 and the reference electrode 22 affords a direct measure of the oxidation-reduction potential $E_h$ of the solution. When evaluated together with the pH measurement, the $E_h$ measurement provides an indication of the oxidizing or reducing characteristics of the test solution for, e.g. biochemical purposes.

An apertured protective jacket 36, open at the bottom, protects the sensors from mechanical damage while permitting the test solution (e.g. sea water) to flow around them. The filling solution supply for the reference electrode 22 is generally shown at 38.

Referring now to FIG. 3, the glass electrode assembly 20 is shown to be mounted to the plate 26 by a Plexiglass bracket 40. A tube 42 of flexible plastic is press-fitted over the cylindrical flange 44 of the bracket 40. At its lower end flexible tube 42 is press-fitted to a sturdy glass fitting 46, to whose lower end the glass membrane element 48 is attached by a resilient insulating adhesive 50 such as silicone rubber. The purpose of the flexible adhesive 50 is to permit limited relative movement of the membrane element 48 with respect to the glass fitting 46. This prevents the formation of tensional stresses in the glass due to the difference in the expansion coefficients of the two parts, which results from the fact that the fitting 46 is preferably made of Pyrex glass and the membrane element 48 is preferably made of soft glass.

It will be understood that the membrane element 48 has relatively thick walls at its upper portion 52 and has a very thin spherical tip 54 which constitutes the glass membrane across which the potential to be measured is developed.

The interior of the glass membrane element 48 is filled with a filling solution 56 composed of 0.1 normal HCl and 2 mols/liter of potassium chloride. The solution 56 is saturated with silver chloride for purposes hereinafter described. The reason for this acidic filling solution is that, unlike most neutral or basic solutions, its pH is essentially stable with even very large pressure variations. Inasmuch as the glass membrane potential is a function of the difference between the pH of the glass electrode assembly filling solution and the pH of the test solution, it is essential to maintain the pH of the glass electrode assembly filling solution as constant as possible.

The open top of the glass membrane element 48 is closed off by a Plexiglass disc 58 provided with a filler opening 60 and an electrode passage 62. A connector tube 64 extends from the filler opening 60 to a pressure tube 66 of flexible material which extends upwardly into the tube 42 and is closed off at its upper end by a glass plug 68.

The silver electrode wire 70 described more fully hereinafter, which carries at its lower end a silver chloride bead 72, extends through the electrode passage 62 into a flexible wire conduit 74. The electrode wire 70 is connected to an insulated wire 76 at the bottom of the conduit 74 by a solder joint 78, and is joined to the lead-in wire 80 coming through the feed-through plug 82 by a releasable connector 84 located at the upper end of conduit 74.

The lower ends of the pressure tube 66 and the conduit 74 are retained in a fixed position with respect to the glass fitting 46 and glass membrane element 48 by an epoxy cast 86. The epoxy cast 86 is prevented from adhering to the glass fitting 46 and glass membrane element 48 by coating the latter two with a film of silicone oil before casting the epoxy. Alternately, the epoxy cast may be replaced by a silicone rubber cast or other flexible material of high insulating properties.

The glass fitting 46 is provided with a filler nipple 88 which can be closed off by a flexible cap 90. In assembling the device, the glass membrane element 48 is first filled with the acidic filling solution through the pressure tube 66 and filler opening 60. The filling solution is permitted to fill the pressure tube 66 all the way to the top, and the glass plug 68 is then inserted to close the upper end of the pressure top 66. After the entire electrode assembly has been mounted on the plate 26, the flexible tube 42 is filled through the filler nipple 88 with silicone oil or other liquid having high insulating properties. The filler nipple 88 is then capped with the cap 90, and the assembly is ready for use.

When the above described electrode assembly is immersed in sea water, the pressure of the water compresses the flexible tube 42 and transmits the water pressure to the silicone fluid in the tube 42. The pressure of the silicone fluid in turn compresses the flexible walls of pressure tube 66 and transmits a like pressure to the filling solution 56 in the glass membrane element 48. In this manner, the pressure between the interior and the exterior of the glass membrane 54 is equalized.

It will be noted that the above described construction maintains both the electrode wire and the filling solution in complete electrical isolation from the sea water and from the probe structure. The Plexiglass disc, silicone rubber, epoxy cast, and silicone fluid all are highly effective insulators, and the connector 44, by which the insulated wire 76 is connected to the leadin wire 80, is completely immersed in insulating silicone fluid. By this construction, it is possible to obtain the advantages of separation of the various liquids by pressure transmitting membranes and yet keep the insulation resistance in all parts of the probe several orders of magnitude above the $10^7$ ohm internal resistance of the probe circuit, so that no significant current leakage can occur.

The feed-through plug 82 is illustrated in greater detail in FIG. 4. In that figure, the lead-in wire 80 is shown as a platinum wire encased through a portion of its length in a glass rod 92. The glass rod 92 is inserted through the cylindrical bore 94 in the plug body 96 which can be screwed into an opening in the plate 26 by means of screw threads 98. An O-ring 100 is provided in a groove of the plug body 96 to provide a pressure-tight seal between the plug body 96 and the plate 26.

After insertion of the glass rod 92, the cylindrical bore 94 is filled with an epoxy adhesive 102 which will maintain the glass rod 92 against either longitudinal or lateral movement under pressure within the bore 94. To reduce surface leakage, it is advantageous to soak the entire plug assembly after the epoxy has been cured and the assembly has cooled, in silicone fluid in a vacuum for about 30 minutes so that the silicone fluid will penetrate and replace any air bubbles on the surface of the epoxy.

FIG. 5 shows the construction of the reference electrode assembly 22. As in the glass electrode assembly, a flexible tube 104 is press-fitted onto the cylindrical flange 106 of a Plexiglass mounting bracket 108. A feed-through plug 110 identical in construction to the feed-through plug 82 is mounted in pressure-tight relationship in an opening 112 of plate 26. The lead-in wire 114 is connected by a releasable connector 116 to an insulated wire 118 whose lower end is soldered at 120 to the upper end of the silver electrode wire 122. A Plexiglass fitting 124 is press fitted into the lower end of flexible tube 104 and is provided with a filler nipple 126 closed off by a flexible cap 128. The electrode wire 122 is held in the fitting 124 by an epoxy cast 130. The wire 122 is provided at its lower end with a silver chloride bead 132.

It will be noted that the fitting 124 has an upper chamber 134 and a lower chamber 136, the latter being closed off by a screw-threaded cap 135 provided with a central opening 137. A rubber disc 139 provides a seal between the cap 135 and the fitting 124. The disc 139 also supports an asbestos wick 141 which extends through the disc 139 into the opening 137 and permits a controlled amount of reference filling solution to continuously escape from lower chamber 136 into the test solution. The screwthreaded cap 135 and disc 139 allows convenient replacement of the wick 141 if it becomes clogged. Of course, any other electrolyte-permeable member, such as, e.g. a ceramic plug, may be used in lieu of wick 141. The lower chamber 136 also has an inlet 144 onto which is press fitted a flexible pressure tube 146. The other end of the pressure tube 146 is press fitted onto a syringe 148 equipped with a plunger 150. The plunger 150 is subject to a constant downward bias through operating rod 152 by virtue of the springs 154, 156 acting between the cap 158 and the plate 160.

In use, the upper chamber 134 and flexible top 104 are filled with silicone fluid through the filler nipple 126 which is then closed off with the cap 128. The silicone fluid in the upper chamber 134 insures satisfactory electrical insulation of the upper end of the electrode wire 132, insulated wire 112, lead-in 114 and connector 116. Next, the lower chamber 136, pressure tube 146 and syringe 148 are filled with a filling solution identical to the solution 56 except that it lacks the HC1. The plunger 150 is then inserted into the top of the syringe, and the springs 154, 156 are connected. The pressure exerted by the springs 154, 156 gradually forces the filling solution through the electrolyte-permeable wick 141 and out into the sea water surrounding the electrode assembly.

It will be noted that the rate of discharge of the filling solution will be independent of the sea water pressure, as the sea water pressure is applied to the top of plunger 150, as well as to its bottom by virtue of the compression of the pressure tube 146. Likewise, the sea water pressure is applied to the upper chamber 134 by virtue of the compression of flexible tube 104. In this manner, the lower chamber 136 is maintained at a fixed amount of pressure above the environment of the probe, regardless of the amount of environmental pressure present.

FIG. 6 illustrates, in block diagram form, the electrical apparatus associated with the device of this invention. It will be noted that a portion of the electrical system is contained within the probe 10, whereas another portion is contained within the control apparatus 18 on board the ship 14. Considering first the probe 10, it will be seen that the potential developed between glass electrode 70 and reference electrode 22 is amplified by a DC amplifier 162 in the normal, open, condition of shorting switch 164. The output of amplifier 162 is fed to contact 166 of stepping relay 168, whose wiper 170 is connected to the input of the analog-to-frequency converter 172. The output of the analog-to-frequency converter is amplified by a cable driver 174 and is fed to the cable 16 through a signal coordinating circuit 176. The signal coordinator 176 is in effect a filter circuit of conventional construction which determines the proper routing of the variable frequency signals from cable driver 174, the DC "zero" command signals to relay 178, and the "step" command pulses for operating relay driver 180.

The output of the temperature sensor 28 is connected to contact 182 of stepping relay 168, and the output of pressure sensor 32 is connected to contact 184 of the same relay. In the normally open position of shorting switch 164, the output of the $E_h$ electrode 37 with respect to the reference electrode 122 is amplified by amplifier 185, which provides a current output to contact 187 of stepping relay 168. The remaining contacts of stepping relay 168 are connected to various internal check points throughout the probe circuitry, by means of which the battery condition, accuracy of the reference voltage, and other circuit parameters can be remotely checked.

The probe 10 is also provided with a battery 186, a high stability regulator and a regulated power supply 190, which provide the operating voltages for the probe electronics and the reference voltages for the analog-to-frequency converter 172 described in more detail hereinbelow.

The shipboard control apparatus 18 includes a frequency-responsive readout device 192 of any desired type (e.g. a pulse counter) to which the variable frequency signal from the analog-to-frequency converter 172 is supplied through the output transformer 194 from the cable 16 through the mode switch 196. In the "read" position of the mode switch 196, the cable 16 is connected directly to the output transformer, and the readout device will provide a readout of whichever probe parameter has been selected by the stepping relay 168. In the "zero" position of mode switch 196, the readout device still receives the output frequency of the analog-to-frequency converter 172, but a battery 198 is additionally connected into the cable circuit to provide a DC voltage which the signal coordinator 176 routes as a "xero" command to the relay 178. The relay 178 thereupon closes switch 164 to ground the inputs of the amplifiers 162, 185 so that the readout device may be calibrated to compensate for any drift of the amplifiers 162, 185.

In the "select" position of mode switch 196, stepping relay 168 in the probe 10 may be actuated to select any probe parameter for readout as determined by the position of selector switch 200. The wiper of selector 200 is connected to a free-running multivibrator 202 which produces stepping pulses as long as its input is not grounded. The pulses produced by the multivibrator 202 are amplified in a pulse amplifier 204 and are fed both into the cable 16 and to the input of a stepping relay 206. The pulses coming through the cable 16 are recognized by the signal coordinator 176 as "step" commands.

At the same time, the same pulses also cause operation of stepping relay 206 in synchronism with stepping relay 168. As soon as stepping relay 206 reaches a position in which its wiper 208 becomes connected to the wiper of selector switch 200, the input of the multivibrator 202 becomes grounded and no further pulses are transmitted. It is thus possible to remotely control the stepping relay 168 by operation of the selector switch 200 so as to provide a readout of any desired probe parameter.

If at any time the stepping relays 168 and 206 go out of synchronism, they can readily be resynchronized by switching the selector switch 200 and taking readouts at each position until a recognizable position (e.g. a position corresponding to the known readout of an internal reference voltage) is reached. With the mode switch 196 in the "read" position, the selector switch 200 is then set to the setting which corresponds to the known readout. In the "read" position of the mode switch 196, stepping pulses are conveyed to relay 206 but not to relay 168.

FIG. 7 is a block diagram of a novel type of analog-to-frequency converter circuit, which, due to its reliability and simplicity, is particularly useful in this application but which, it will be readily understood, has utility in other fields also. For the purposes of the apparatus described herein, the converter of this invention has the particular advantage of unusually small size and low power consumption, as compared to conventional converters, due to the simplicity of its circuitry.

The current input from the wiper 170 of stepping relay 168 is fed to the input of an operational amplifier 210 which is bridged by an integrating capacitor 212. The output voltage at point 214 therefore rises at a rate determined by the current input from wiper 170 (and consequently by the selected DC potential to be measured, the circuit resistance being fixed).

The output voltage at 214 is also fed to the input of a level detector 216 which is arranged to produce a pulse when the output voltage at point 214 reaches a predetermined level. The pulse produced by the level detector 216 is then stretched in a pulse stretcher 218 and is applied to the input of a driver circuit 220 which has two outputs 219, 221. The output 219 produces a relatively long negative pulse in response to the input pulse, whereas the output 221 produces a relatively short positive pulse generally centered with respect to the negative pulse at 219. A pair of field effect transistors (FETs) 222, 224 are connected, respectively, between a source of positive reference voltage and a capacitor 226, and between the capacitor 226 and the current input to the amplifier 210. The bases of the FETs 222, 224 are driven, respectively, by the outputs 219 and 221 of the driver 220.

The use of the FETs in the circuit of this invention is dictated by the fact that FETs act as pure resistors when conducting. By contrast, ordinary transistors have a temperature-dependent voltage drop in their output circuit when conducting Inasmuch as the accuracy of the converter of this invention depends on charging the capacitor 226 to an exactly constant reference voltage, and then transferring the charge in an exactly constant manner to the integrating capacitor 212, the use of FETs, by eliminating the temperature-dependent drop, provides the necessary accuracy for the circuit.

During the absence of a pulse (i.e. during the rise time of the output voltage 214), the FET 222 conducts and charges the capacitor 226. When the output voltage 214 reaches the predetermined level set by the level detector 216, FET 222 is blocked, FET 224 conducts, and capacitor 226 discharges through FET 224. This causes the integrating capacitor 212 to at least partially discharge, and the output voltage 214 to return to a minimum value. Following the end of the stretched pulse from the level detector 216, the transistors 222, 224 return to their original condition and the output voltage 214 again begins to rise. Inasmuch as the required time for the output voltage 214 to reach the level set by level detector 216 is determined by the current input to the operational amplifier 210, the output voltage 214 takes the form of a sawtooth wave of a frequency directly proportional to the DC input current to amplifier 210.

The actual circuit diagram of the converter shown in FIG. 7 is shown in FIG. 8.

It will be seen in FIG. 8 that the level detector 216 consists of a unijunction transistor (UJT) which produces a single output pulse when the output voltage 214 reaches the firing level determined by the relationship of resistors 228, 230. The UJT serves both as a level detector and a safety device to prevent locking of the converter. Locking may occur if too large a signal is momentarily fed to the converter. In such a case the charge on capacitor 226 will not be sufficient to reduce the amplifier's output below the firing level, and hence the input will be integrated until the amplifier reaches saturation. This situation is prevented by capacitor 231 which causes self-oscillation of the UJT as long as the output of the amplifier is above its firing level. If locking conditions occur, the UJT pulse train will thus persist until enough charge is fed to the operational amplifier to reduce its output below the firing level.

The driver 220 of FIG. 7 includes transistors 232 and 234 in FIG. 8. The former is connected to produce a square wave pulse which is applied to FET 222, whereas the latter produces a narrower spike pulse, shaped by capacitor 229, which is fed to the base of FET 224. The purpose of this arrangement is to assure that transistor 222 is turned off whenever transistor 224 is turned on, so as to prevent direct uncontrolled connection of the reference voltage source 236, without the intermediary of storage capacitor 226, to the integrating capacitor 212.

The two diodes 235 and 237 at the inputs of FETs 222 and 224 are incorporated to block any current leakage through the gate of the FET. This eliminates the necessity of using an isolated-gate FET. Current drain is prevented by the fact that during the conducting time of each FET, the potential of the control pulse at the driver output 219 or 221 is considerably higher than the reference voltage applied to the FET's source-drain circuit (e.g. 13V as opposed to 6.2 Vl. Hence, during that time, the diode 235 or 237 acts as an open circuit, and the base of the FET is effectively connected to the source of the same FET through the resistor 239 or 241.

An offset voltage, preferably the same as the 6.2V reference voltage, is applied at terminal 243 to provide compensation for the input current of the operational amplifier. By adjusting the variable voltage divider 245, 246, the amplifier can be adjusted so that the output of the circuit is 0 cp.s when the current input from terminal 170 is 0. Likewise, the input voltage offset can be adjusted to 0 by the bridging potentiometer 248.

In practice, the presence of transformers in the readout equipment circuitry sets a lower limit of about 400 cp.s for the usable converter output frequency. Consequently, the converter has to be calibrated not at zero input, but at a known reference input which can be conveniently derived from the 6.2V reference voltage.

If the number of cycles at output 214 are counted for one second in the readout device 192 by a frequency-counter type of readout device, the readout is in cycles per second, and is hence directly proportional to the potential to be measured. However, the time necessary to obtain a sufficiently accurate cycle count may be too long for practical purposes.

In that case, it may be preferable to use a readout device 192 which indicates the period of each cycle, i.e. the inverse of frequency. To keep the scale linear, it is then necessary to make the frequency of the signal transmitted over the cable 16 inversely proportional to the potential to be measured. This can be accomplished in the circuit of FIG. 8 by simply interchanging the input and reference voltage connections as shown in parentheses in FIG. 8. The integrating capacitor 212 then has a constant charging slope but is discharged to a varying degree upon the firing of transistor 224 depending on the energy stored in capacitor 226. The latter is, of course, directly proportional to the input current and hence to the potential to be measured. The net result is a sawtooth wave at output 214 whose frequency is inversely proportional to the potential to be measured.

FIGS. 9a, b, c illustrate the processing of the electrode wires 70 and 122. FIG. 9a shows the manner in which a silver wire 238 is bent at its lower end to form a hook 240. After cleaning, as by as by immersion in warm 30 percent nitric acid for about 15 minutes, the wire 238 is repeatedly dipped, in an inert atmosphere as shown in FIG. 9b, into a bead of melted silver chloride 242 at about 600° C. As shown in FIG. 9c, this results in the formation of a small layered silver chloride bead 244 within the hook at the end of wire 238.

After mounting in the electrode assembly, the electrode thus formed is immersed into the filling solution, which must meet two criteria. First, the filling solution must be saturated with AgCl; and secondly, it must have a high concentration of chloride ions, as too low a chloride ion concentration results in instability of the device. At least 2 mols/liter (M) of chloride ions are required, and about 2.7 M is preferred, rather than a saturated solution of about 3 M, in order to prevent salt precipitation at low temperatures.

The above described solution produces a uniform silver chloride coating on the bare silver portions of wire 238 which are immersed in the filling solution. This coating is electrolytically maintained by the solution throughout the life of the electrode, and the electrode thus maintains its accuracy in spite of any physical damage it may sustain in use.

I claim:

1. An electrode assembly for high-pressure pH measurement, comprising:
   a. bracket means for mounting said assembly to a support;
   b. rigid insulating fitting means;
   c. flexible tube means forming a first fluid-tight compartment therein interconnecting said bracket means and said fitting means; and
   d. ion-selective membrane element means resiliently secured to said fitting means, said membrane element means including apertured insulating closure means therein cooperating with said membrane element means to form a second fluid-tight compartment therein separated in a fluid-tight manner from said first compartment, and elongated flexible conduit means communicating with an aperture in said closure means to permit filling said second compartment with fluid and pressurizing said fluid.

2. the device of claim 1, further including an electrode wire disposed through an electrode aperture in said closure means, and a castable insulating material overlying said closure means to hold said fluid-tight wire in a fixed position fluid-tight respect to said closure means.

3. A probe comprising:
   a. a support;
   b. an electrode assembly mounted on said support, said electrode assembly including a first fluid-tight compartment adapted to contain an insulating fluid therein, the walls of said first compartment being flexible, a second fluid-tight compartment adapted to contain an electrolyte therein connected to said first fluid-tight compartment and separated therefrom in a fluid-tight manner, and a flexible fluid-tight element extending from fluid communication with the interior of said second compartment into contact with the interior of said first compartment.

4. The probe of claim 3 wherein the walls of said second compartment include an ion-selective membrane along at least a substantial portion thereof.

5. The probe of claim 3 wherein said flexible fluid-tight element includes a tubular member extending from said first compartment to said second compartment.

6. The probe of claim 3 wherein said support includes an aperture therein and said assembly is mounted to said support via a pressure-tight feed-through plug disposed in said aperture.

7. The probe of claim 3, in which said first compartment is filled with an insulating fluid, and said second compartment is filled with an electrolyte.

8. The probe of claim 7, in which said electrode assembly is removable from said support and contains an electrode immersed in said electrolyte; said assembly further including first electrical lead means connectable to second electrical lead means carried by said support; said first lead means and the connection means for connecting said first and second lead means being entirely immersed in said insulating fluid.

* * * * *